No. 756,290. PATENTED APR. 5, 1904.
R. C. SAYER.
WHEEL.
APPLICATION FILED SEPT. 15, 1902.
NO MODEL. 6 SHEETS—SHEET 1.
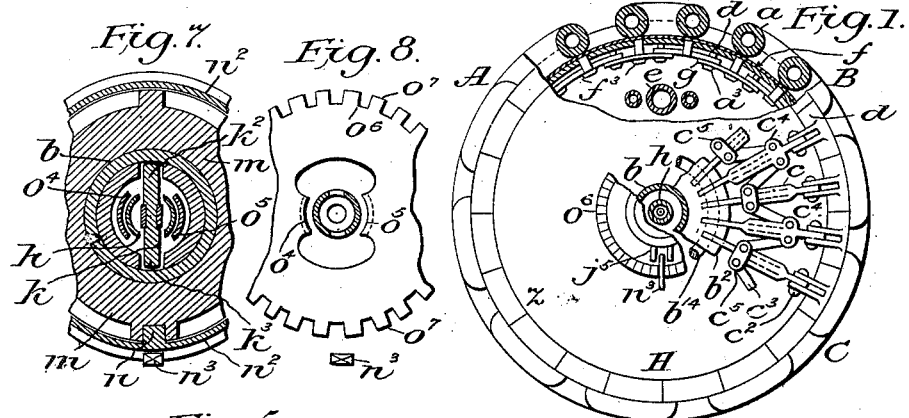
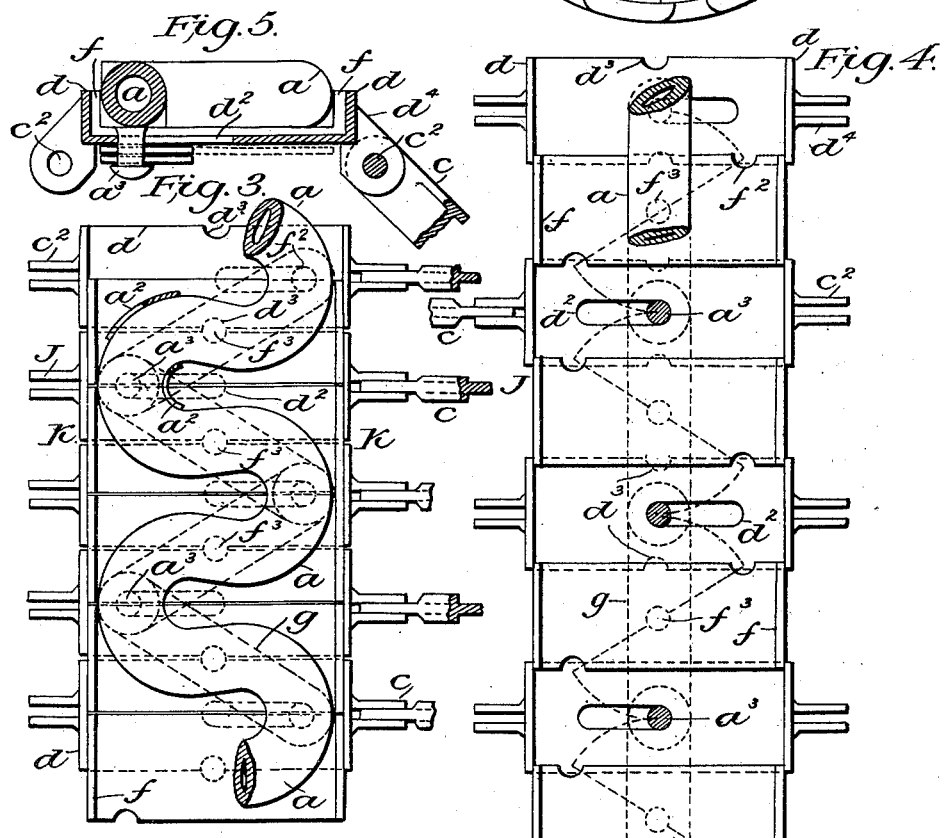
Witnesses:
Samuel Percival
Albert Jones
Inventor:
Robert Cooke Sayer
By his Attorneys.
Wheatley & Mackenzie

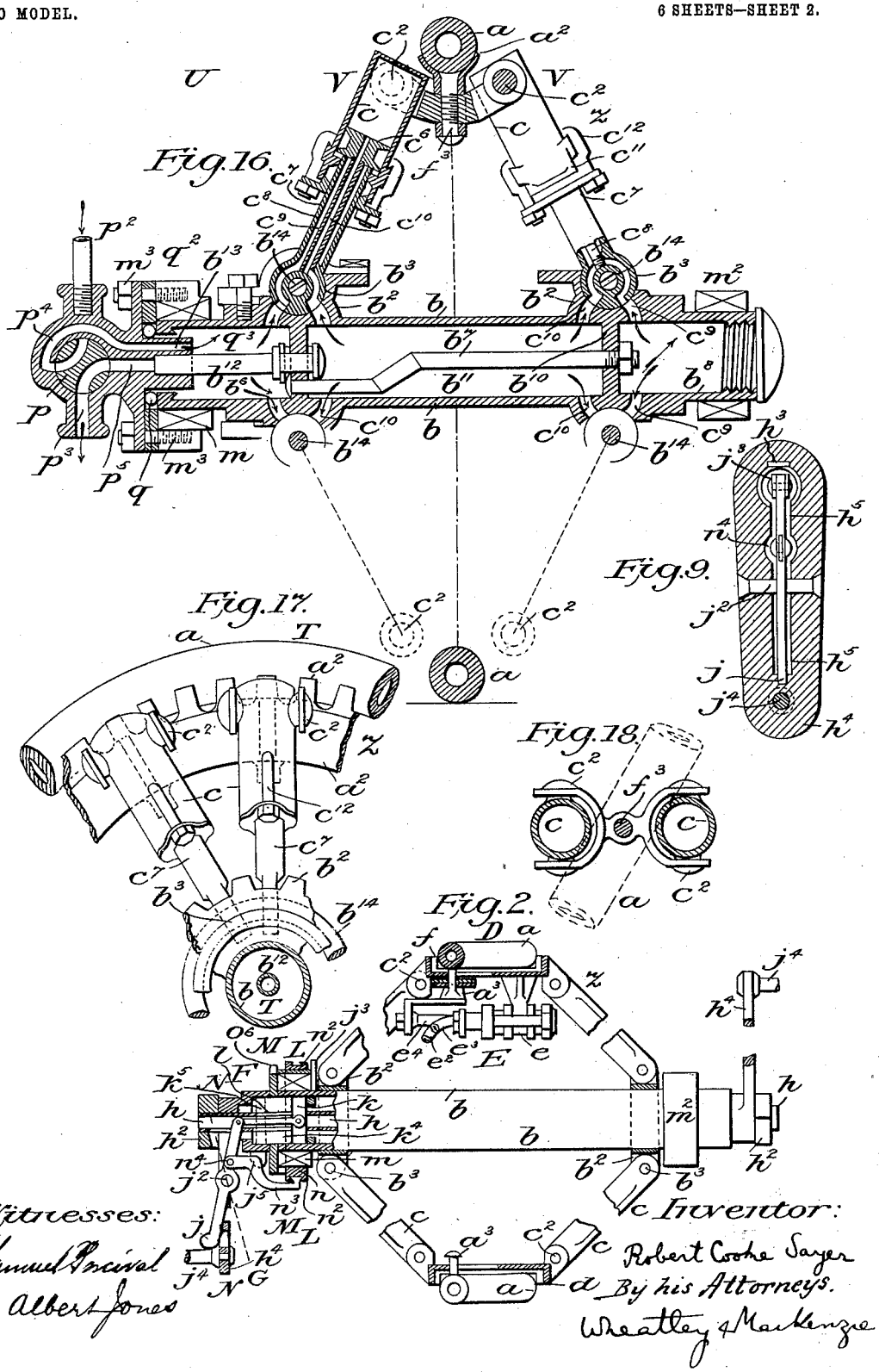

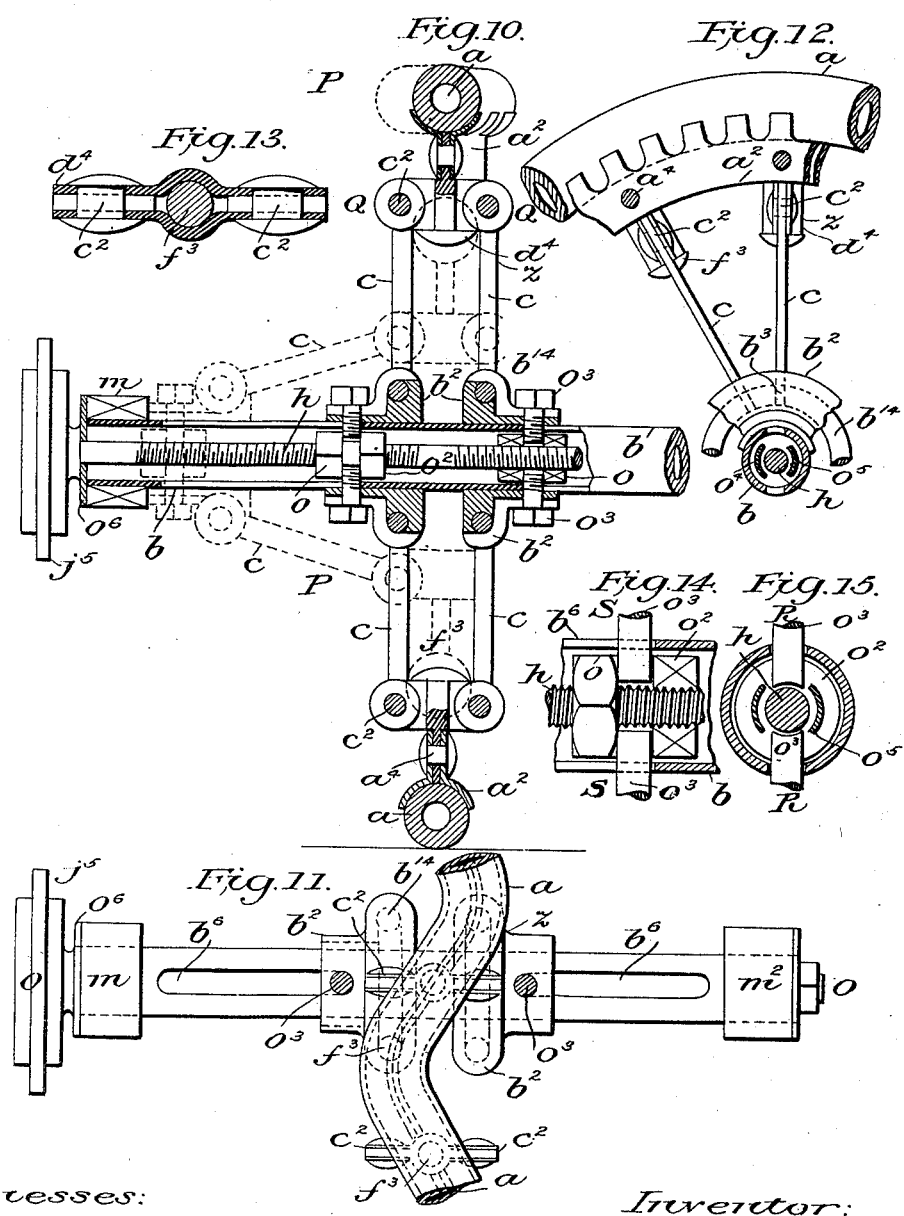

No. 756,290. PATENTED APR. 5, 1904.
R. C. SAYER.
WHEEL.
APPLICATION FILED SEPT. 15, 1902.
NO MODEL. 6 SHEETS—SHEET 4.
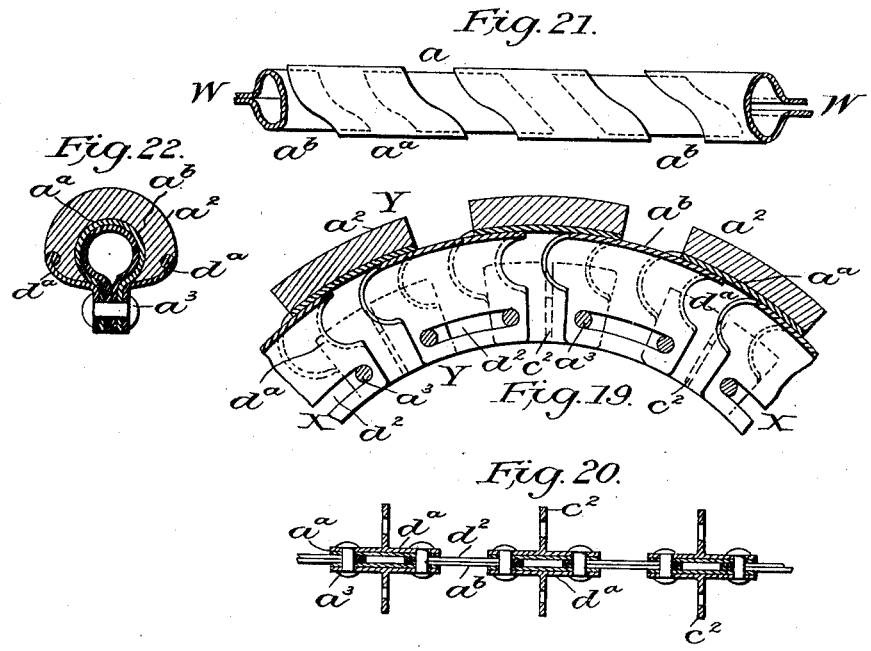
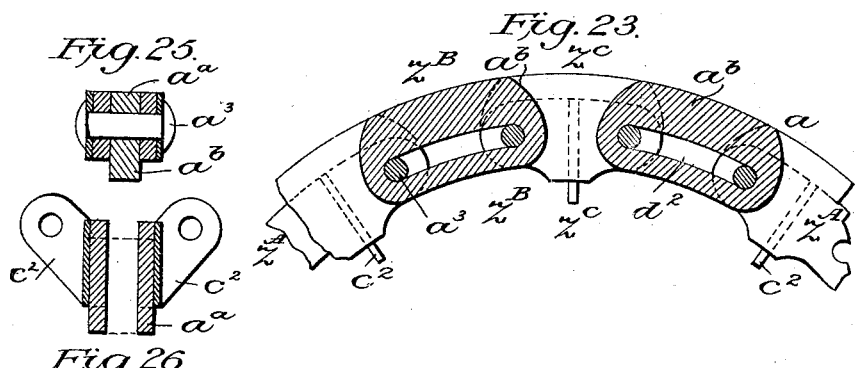
Witnesses:
Samuel Percival
Albert Jones
Inventor:
Robert Cooke Sayer
By his Attorneys.
Wheatley & Mackenzie No. 756,290. PATENTED APR. 5, 1904.
R. C. SAYER.
WHEEL.
APPLICATION FILED SEPT. 15, 1902.
NO MODEL. 6 SHEETS—SHEET 5.

Witnesses:
Albert Jones
Herbert C. Bolwell

Inventor:
Robert Cooke Sayer
By his Attorneys.
Wheatley & MacKenzie

No. 756,290. PATENTED APR. 5, 1904.
R. C. SAYER.
WHEEL.
APPLICATION FILED SEPT. 15, 1902.
NO MODEL. 6 SHEETS—SHEET 6.
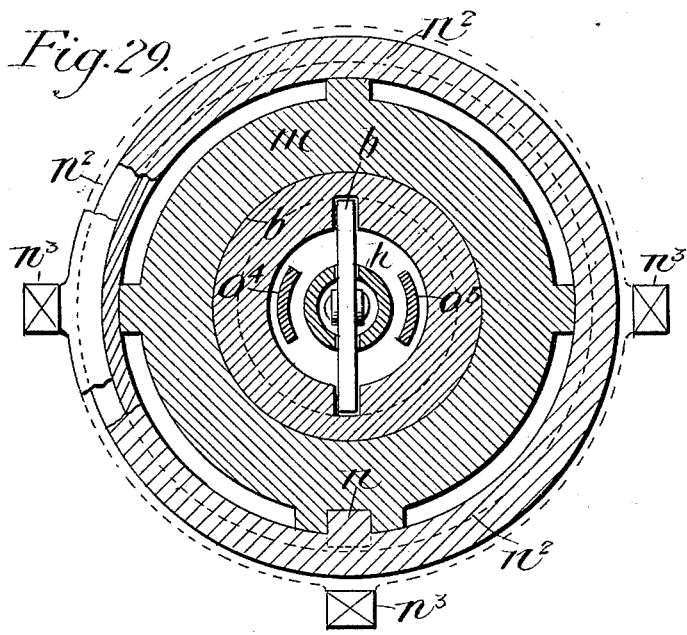
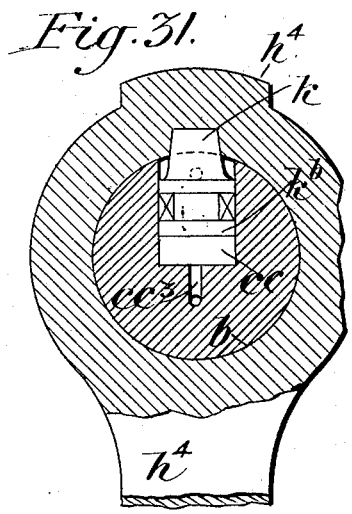
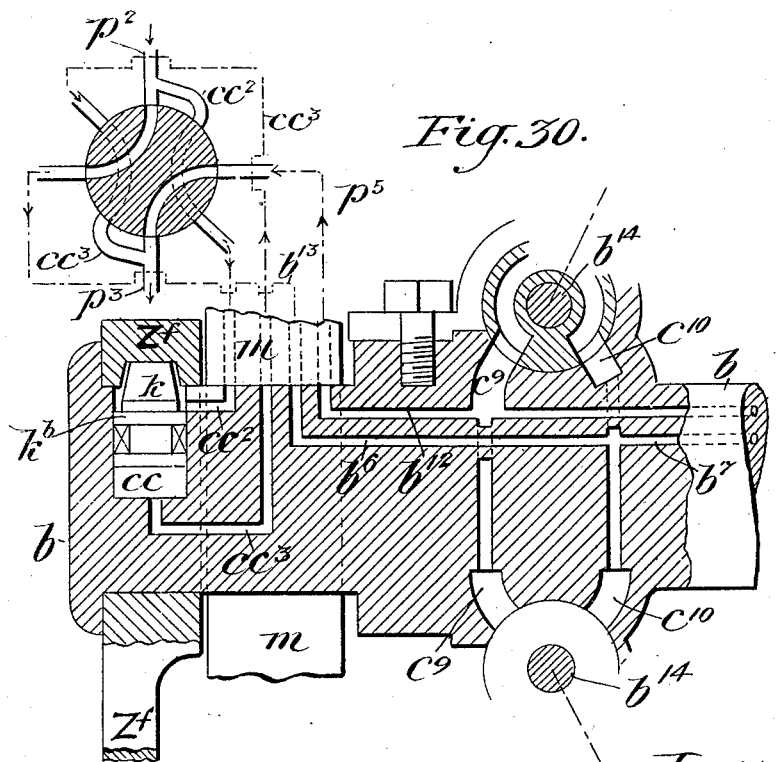
Witnesses:
Albert Jones
Herbert C. Bolwell
Inventor:
Robert Cooke Sayer
By his Attorneys
Wheatley & Mackenzie No. 756,290. Patented April 5, 1904.

UNITED STATES PATENT OFFICE.

ROBERT COOKE SAYER, OF BRISTOL, ENGLAND.

WHEEL.

SPECIFICATION forming part of Letters Patent No. 756,290, dated April 5, 1904.

Application filed September 15, 1902. Serial No. 123,547. (No model.)

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Wheels; and I do hereby declare the following to be a full, clear, and exact description of the invention, such as will enable others skilled in the art to which it appertains to make and use the same.

The object of this invention is to construct wheels in such a manner that whether in motion or stationary their diameters may be varied by fluid, foot, or hand pressure, and so that they may also be used as free wheels. It is applicable to wheels of all classes whether for stationary or locomotive machinery.

Figure 27:
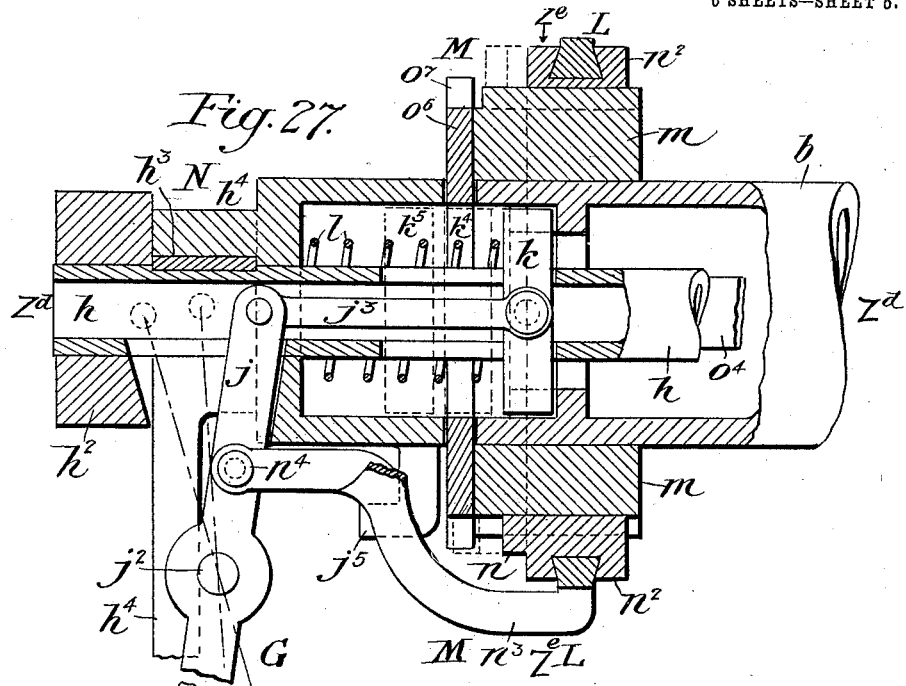
Figure 28:
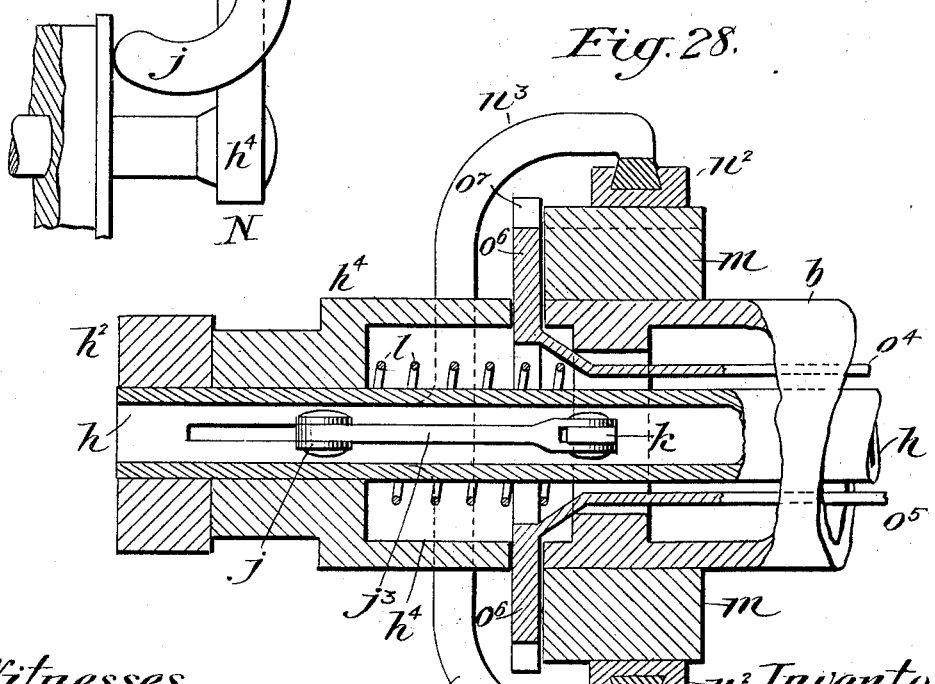

In the accompanying drawings, Figure 1 is in part a section from A to B at D E, Fig. 2, sectional elevation from B to C and to A without ribs at F G, Fig. 2, of a wheel having a straight tire when at its greatest diameter. Fig. 2 is a sectional elevation at H H, Fig. 1. Fig. 3 is in part a developed plan from A to B, Fig. 1. Fig. 4 shows the same when expanded. Fig. 5 is a section at J J, Fig. 3. Fig. 6 is a section at K K, Fig. 3. Fig. 7 is a section at L L, Fig. 2. Fig. 8 is a section at M M, Fig. 2. Fig. 9 is a section at N N, Fig. 2, to a larger scale. Fig. 10 is in part a sectional elevation at O O, Fig. 11, of a wheel having a spiral tire at its greatest diameter. Fig. 11 is in part a plan of Fig. 10, showing a portion of the tire developed. Fig. 12 is in part a sectional elevation at P P, Fig. 10. Fig. 13 is a section at Q Q, Fig. 10. Fig. 14 is a portion of the hollow shaft and screw, Fig. 10, in section at R R, Fig. 15. Fig. 15 is a section at S S, Fig. 14. Fig. 16 is in part a sectional elevation of a wheel having a spiral tire at its greatest diameter actuated by fluid-pressure regulated by hand at T T, Fig. 17. Fig. 17 is in part a sectional elevation at U U, Fig. 16. Fig. 18 is a section at V V, Fig. 16. Fig. 19 is a section of an alternative tire at W W, Fig. 21. Fig. 20 is a section developed at X X, Fig. 19. Fig. 21 is a plan of the tire-tubes. Fig. 22 is a section at Y Y, Fig. 19. Fig. 23 is a section of an alternative tire at Z Z, Fig. 24; Fig. 24, a section developed at $Z^a Z^a$, Fig. 23; Fig. 25, a section developed at $Z^b Z^b$, Fig. 23; and Fig. 26 a section developed at $Z^c Z^c$, Fig. 23. Fig. 27 is an enlarged detail of Fig. 2. Fig. 28 is a section at $z^d z^d$, Fig. 27; and Fig. 29 is a section at $z^e z^e$, Fig. 27. Fig. 30 is an enlarged detail of Fig. 16; and Fig. 31 is a section at $z^f z^f$, Fig. 30.

The wheel Z, shown in Figs. 1 to 9, is formed with jointed spokes. Its tire $a$, as shown in Figs. 1 to 3, is at its smallest diameter. The tire $a$ consists of an elastic tube having thin spring-plates $a^2$, Fig. 3, or $a$ may be substituted by $a^2$ or by other means giving sufficient expansibility. Referring to Fig. 2, the wheel has a hollow axle $b$, on which collars $b^2$ are mounted. The rims or spokes $c$ are hinged to the collar $b^2$ by the ring $b^{14}$. The other ends of the ribs $c$ are hinged to serrated plates $d$ by means of the bolts $c^2$ and ears $d^4$, Figs. 3 and 5. The plates $d$ contain slots $d^2$, sliding on bolts $a^3$, Fig. 3, when the wheel is contracted or expanded in diameter. Besides the plates $d$ there is another set, (marked $f$, Figs. 1, 3, 4,) which slide on the plates $d$. Bolts $f^3$ are fixed to the tire $a$, pass through and are able to rotate in the serrated plates $f$, and form axes for the links $g$. It will be seen that the ends of the links $g$ hinge on the bolts $a^3$, and hence if pressure is applied (by means described below) tending to increase the diameter of the wheel—that is, to alter the shape from that shown in Fig. 3 to that shown in Fig. 4—the tendency is for the links $g$ to straighten themselves and become parallel to the periphery of the wheel. The plates $f$ have recesses $f^2$, which encircle the bolts $a^3$ when the wheel is at its smallest diameter. To one of the bolts $a^3$ is hinged the piston-rod $e^4$, working in the double-acting cylinder $e$, Figs. 1 and 2. The cylinder is supplied with pressure or exhausted by means of tubes $e^2$ and $e^3$ and suitable taps or valves. (Not shown.) It will be seen that by sliding one or more of the bolts $a^3$ along a slot $d^2$ by means of the piston-rod $e^4$ the plates $d$ and $f$ will be caused to slide one on the other, and hence the diameter of the wheel will be increased or decreased. The hollow axle $b$, Figs. 2, 7, 9, contains a right and left handed hollow screw and spindle $h$ running right through it centrally. Cranks $h^4$ are fixed at each end of this screw. The screw-spindle is held by nuts $h^2$ at each end. The cranks are keyed to the spindle by the keys $h^3$, Fig. 9. The crank is slotted at $h^5$, Fig. 9, to receive the lever $j$, mounted on the pin $j^2$. This lever passes through a slot, as shown, in the hollow screw-spindle $k$ and is connected to a link $j^3$ in the interior of the screw-spindle. (See Fig. 2.) This link is connected to a key $k$, Figs. 2 and 7, which slides in slots in the screw-spindle. Hence it will be clear that the key $k$ may be made to move laterally along by depressing the lever $j$. From Fig. 7 it will be seen that the ends $k^2$ and $k^3$ of the key $k$ terminate in slots formed inside the hollow axle $b$. These slots form keyways of given length, and hence when the key $k$ is in such a position that its end engages these slots the rotation of the crank causes the axle $b$ to rotate, and hence the wheel $z$. Now if the lever $j$ be depressed the key $k$ is moved along, so as to disengage from the slots fixed to the interior of $b$, and hence the cranks may rotate without rotating the wheel, or, vice versa, forming a free wheel arrangement. A spring $l$ is arranged so as to bring the key $k$ back to its original or engaging position when pressure is removed from $j$, and hence by synchronizing the revolutions of $h$ and $b$ the two shafts may be made to reëngage. The arrangement of the key $k$ for rotating the axle $b$ is to suit the wheel illustrated; but for other wheels it is constructed to suit the size of the wheel and power used.

The axle $b$ may be solid, the key $k$ in the form of a piston $k^6$, Figs. 30 and 31, operated either way in a cylinder $c\ c$, regulated like but by a separate tap $p$, the pistons $c^6$ of the wheel $z$, or by the same tap $p$, as shown, provided with passages $c\ c^2$ and $c\ c^3$, and having a third position dotted on Fig. 30 to cut off the cylinders $c$ and actuate the piston $k^6$ and key $k$.

The shaft $h$ (see Figs. 10 to 15) is adapted to the drawings to a modified wheel Z, but is equally applicable to that shown in Fig. 2. It carries screw-nuts $o\ o^2$, Figs. 10 to 14. Bolts $o^3$ pass between these nuts and also through the slots $b^6$ in the axle. These bolts are secured to collars $b^2$, so that if the nuts are prevented from rotating by suitable means the collars $b^2$ will slide along the axis. The nuts $o\ o^2$ are prevented from rotating by the locking-straps $o^4\ o^5$, Figs. 8 and 15, which pass through the nuts $o\ o^2$. These straps are extended and connected together to form a disk $o^6$, Figs. 8 and 11. This disk is provided with teeth $o^7$, Fig. 8, and normally rotates with the axle $b$ and cranks $h^4$; but when the key $k$ is in the position $k^4$, Fig. 2, its motions are confined to those of the shaft $h$, crank $h^4$, and attached parts; but when the lever $j$ is thrust over farther the key $k$ is drawn by the link $j^3$ to the position $k^5$, Fig. 2, beyond the lock-straps $o^4\ o^5$ and disk $o^6$, Fig. 8.

The bearing $m$, Figs. 2, 7, and 8, has a keyway with a key $n$, in which it is connected to and secured in place by the sides of an annular slot $n^2$, in which is carried the cud or cuds of a link $n^3$, the other end of which is hinged at $n^4$, Fig. 2, to the lever $j$ and passes between the ears $j^5$ on the crank $h^4$ to rotate it. The lever $j$ draws over the link $n^3$ and the slot $n^2$, also the key $n$, which being wedge-shaped at the end passes between a pair of similarly-formed teeth $o^7$ and locks the disk $o^6$ to the fixed bearing $m$, Fig. 2, which by the locking-straps $o^4\ o^5$ prevents the nuts $o\ o^2$ from turning when the crank $h^4$ is turned in either direction to rotate the shaft $h$. Hence the collars $b^2$ are caused to slide along the axle $b$, and the ribs $c$ are caused to assume a more or less vertical position, according to the direction of sliding of $b^2$, and the diameter of the wheel is increased or decreased. When the lever $j$ is released, the spring $l$ causes the key $k$ to return to its original position. In order that the hinges $b^3\ c^2$ and the ribs $c$ may not suffer by torsional strains, alternate ribs $c$ have intermediate ribs $c^3$, Fig. 1, hinged to them by fixed hinges $c^4$, the other ends of $c^3$ being hinged to collars $c^5$, able to slide upon the other intermediate ribs $c$. The ribs $c^3$ are at a sufficient angle to the ribs $c$ when at their greatest expansion to insure that $c^5$ will slide readily.

A further example of the application of the invention is shown in Figs. 10 to 15. In this case the tire $a$ is of zigzag or spiral shape when it is at its greatest diameter. The tire is carried by plates $a^2$, suitably shaped, and is held by means of rivets $a^4$ to clamp it between the plates $a^2$. The rivets $a^4$ also pass through the flattened end of the bolts $f^3$. This bolt $f^3$ is capable of turning between the plates $d^4$, Figs. 12 and 13. The ribs or spokes $c$ hinge between the plates $d^4$ on bolts $c^2$ on either side of the central bolt $f^3$. The wheel $z$ is carried, as in the previous example, by the hollow axle $b$, rotating in bearings $m$ and $m^2$. The arrangement of hinged ribs or spokes is similar to that previously described. The position which these ribs assume when the wheel $z$ is at its smallest diameter is shown by the dotted lines in Fig. 10, the full lines showing it at its greatest diameter. The diameter is varied by means of the screw $h$, (in the hollow shaft,) passing through the nuts $o$ and $o^2$, operated by the wheel $j^5$. It will be easily seen that if the screw $h$ is rotated, the nuts $o$ and $o^2$, and hence the collars $b^2$, sliding in the slots $b^6$, will approach or recede from one another, according to the direction of rotation of the screw, and hence the diameter of the wheel will be varied. The plates $a^2$ accommodate themselves to the increased diameter of the wheel by being drawn from a spiral to a straighter, but not straight, course and to the decrease in diameter by increasing the spirality of the tire.

Figs. 16 to 18 show the previously-described wheel $z$ modified so that fluid-pressure may be used for varying the diameter. For this purpose the ribs $c$ are formed as cylinders having pistons $c^6$. The pistons are fitted with tubular piston-rods for the purpose of supplying pressure to or exhausting the cylinders. The piston-rod consists of two concentric tubes $c^7$ $c^8$, the internal tube $c^8$ being of smaller external diameter than the internal diameter of the external tube $c^7$, thus forming the passage $c^9$ between the tubes. This passage forms the inlet or outlet to the under or piston-rod side of the piston, the passage $c^{10}$ through the tube $c^8$ forming the passage to the other side of the piston. The tubular piston-rod is fixed to the piece $b^3$ hinging on the ring $b^{14}$, Figs. 16 and 17. This piece $b^3$ contains ports which communicate with the passages $c^9$ and $c^{10}$. The piece $b^3$ seats in a block $b^2$, fixed to the axle $b$, and arranged so that in all positions of $b^3$ the passages $c^9$ and $c^{10}$ connect by means of the chamber $b^6$ and passage $b^{13}$ and the chamber $b^{11}$ and passage $b^{12}$ and the two-way tap or valve $p$. The cylinder $c$ on the right-hand side of the vertical center line has its passage $c^9$ connecting to the tap $p$ by means of the chamber $b^8$, tube $b^7$, chamber $b^6$, and passage $b^{13}$. It will be seen that the axle $b$ is divided into the three chambers $b^6$ $b^{11}$ $b^8$ by the diaphragm $b^9$ $b^{10}$. The pipe $p^2$ conveys the pressure to, and the pipe $p^3$ carries away the exhaust from, the valve $p$. The ribs or spokes may also be formed of cylinder and pistons fixed vertically. The valve $p$ is carried on the bearing $m$ by the bolts $m^3$, by means of which any wear of the balls $q$ may be adjusted, the packing $q^2$ and $q^3$ being compressible. The wheel $z$ is shown at its greater diameter. If it be desired to reduce the diameter, the valve $p$ is set as shown and pressure supplied from the pipe $p^2$ through the passage $p^4$ and $b^{13}$, $b^6$, $b^7$, $b^8$, and $c^9$ to the piston-rod side of the piston in any number of cylinders $c$ and exhausted from the other side of the pistons by $c^{10}$, $b^{11}$, $b^{12}$, $p^5$, and $p^3$. If the diameter is to be increased, the valve $p$ is turned ninety degrees in a clockwise direction. Then the passages $c^{10}$ will be supplied with pressure and passages $c^9$ will exhaust. It will be noticed that the cylinders $c$ are hinged at $c^2$ and are fitted with the usual packing-glands $c^{11}$, adjusted by bolts $c^{12}$.

Figs. 19 to 22 show a modification for the tire of a wheel $z$ able to be lengthened or shortened by the above wheels, where $a$ is the tube, not necessarily pressure-tight, formed by the parts $a^a$ and $a^b$ straight on plan, to telescope and slide within one another, and connected by the bolts $a^3$, that slide in slots $d^2$ in $a^b$ $a^a$, having elastic or other covers $a^2$, carried by $a^3$ on consols $d^a$ and ears $c^2$ to connect with the ribs $c$, Figs. 3 and 4.

Figs. 23 to 26 show a modification for the tire $a$ able to be lengthened similarly to the latter, where the tire $a$ is built up of any number of sandwiched series of parts $a^a$ $a^b$, slotted at $d^2$ for the bolts $a^3$ and having ears $c^2$, as above.

A wheel constructed as described is useful, for example, in a dog-cart, and by its use the vehicle can be raised farther from the ground by enlarging the diameter of its wheels, and thus render the dog-cart more adaptable to animals of different sizes. Again, by enlarging or reducing the diameter of one of the wheels the vehicle could be steered round curves, &c., and the center of gravity of the load could also be adjusted by this means, thus preventing the cart from rolling over tangentially. The wheel is also applicable to road-vehicles driven by gearing for the purpose of varying the gear, the diameter of the supporting part being enlarged, while the gear remains the same, thus altering the effective gear.

I claim—

1. A hub, a periphery of overlapping plates, a tire with an expansible and contractible circumferential periphery, links forming spokes connecting the plates to the hub, means for adjusting the links and thus the diameter of the periphery.

2. A hub, a periphery of overlapping plates, a tire with an expansible and contractible circumferential periphery, links forming spokes connecting the plates to the hub, means for adjusting the links and thus the diameter of the periphery, cranks for rotating the wheel, a screw-spindle, nuts, levers and sliding keys in combination with the cranks for adjusting the spokes by means of collars sliding on the axle and providing a free-wheel arrangement substantially as described.

3. A hub, a periphery of plates, a tire, a spindle, nuts and axle, in combination with a crank for rotating the spindle, collars or keys adapted to be connected or disconnected from the spindle or axle and provide a free wheel.

4. A hub, a periphery of overlapping plates, a tire with an expansible and contractible circumferential periphery, links forming spokes connecting the plates to the hub, means for adjusting the links and thus the diameter of the periphery, cranks for rotating the wheel, a piston and cylinder supplied with fluid under pressure or exhausted for varying the diameter of the periphery by operating on the links, substantially as described.

5. A hub, a periphery of overlapping plates, a tire with an expansible and contractible circumferential periphery, links forming spokes connecting the plates to the hub, means for adjusting the links and thus the diameter of the periphery, links formed as cylinder and piston for varying the diameter of the periphery, a tubular piston-rod for conveying fluid-pressure to the cylinders, a hollow axle containing passages and ports for the conveyance of the fluid under pressure to the passages in the piston-rods, substantially as described.

6. A hub, a periphery of overlapping plates, a tire with an expansible and contractible circumferential periphery, links forming spokes connecting the plates to the hub, means for adjusting the links and thus the diameter of the periphery, and means for strengthening the links by attaching one end of intermediate or alternate links to alternate links of the wheel by hinges fixed to the links, the other end of the hinges being fixed to hinged collars sliding on the next link substantially as described.

In testimony whereof I have affixed my signature in presence of two witnesses.

ROBERT COOKE SAYER.

Witnesses:
LIONEL A. WILSON,
CHARLES E. RICKETTS.